Figure 1:
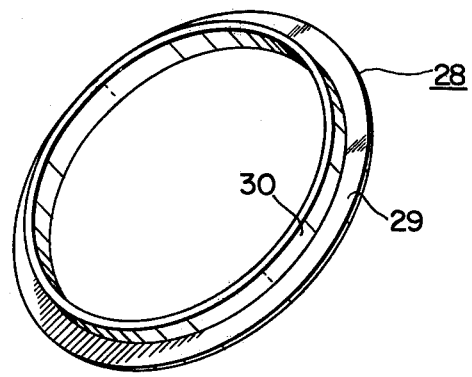

United States Patent [19]

Ruiz-Barbotteau

[11] 4,151,963
[45] May 1, 1979

[54] LONG WEARING MOVIE FILM BOBBINS WITH FLOATING HUBS

[76] Inventor: Alejandro Ruiz-Barbotteau, Villagran Nte. 106, Monterrey, Nuevo Leon, Mexico

[21] Appl. No.: 790,658

[22] Filed: Apr. 25, 1977

[51] Int. Cl.² .................................... B65H 75/18
[52] U.S. Cl. .................................... 242/71.8
[58] Field of Search ............. 242/71.8, 77, 77.2, 242/77.3, 71.9, 115, 116, 118.4, 118.6

[56] References Cited

U.S. PATENT DOCUMENTS

| 3,883,087 | 5/1975 | Praag | 242/71.8 |
| 4,002,309 | 1/1977 | Ruiz-Barbotteau | 242/71.8 |

FOREIGN PATENT DOCUMENTS 346737 10/1929 United Kingdom .................... 242/71.8

Primary Examiner—Edward J. McCarthy
Attorney, Agent, or Firm—Laurence R. Brown

[57] ABSTRACT

This invention provides a long wearing and wear resistant construction of a movie film bobbin having a floating hub. Because of the relative rotation of the hub and panels in this type bobbin and the desired close tolerances, there is a tendency for the parts to wear. This wear is primarily in the radial direction where the panels meet the hub. Thus, a special metallic bearing ring stamping from a flat washer provides a cylindrical surface so that the washer is interspersed between hub and panels with the cylindrical surface engaging the panels in the radial wear direction.

2 Claims, 5 Drawing Figures

LONG WEARING MOVIE FILM BOBBINS WITH FLOATING HUBS

This invention relates to movie film bobbins and more particularly it relates to bobbins having a floating hub relatively rotatable with respect to the film storage panels.

BACKGROUND

My U.S. Pat. No. 4,002,309 issued Jan. 11, 1977, exemplifies movie film bobbins having a relatively rotatable floating hub for winding the film and which meet interfitting storage panels at relatively rotatable bearing surfaces so that the film layers are retained between the panels as they are wound about the hub.

Because of the relative rotation of the hub and panels and the particular interfitting dimensions involved where the panels fit tightly in bearing surfaces on the hub, there is a tendency for the parts to wear to enough of an extent that particular care must be given to assembly tolerances and the kinds of materials used.

OBJECT OF THE INVENTION

Accordingly, it is a general object of this invention to provide improved film bobbins with floating hubs that wear longer and are less critical to assemble.

A more specific object of the invention is to provide improved bearing surfaces between the hub and the relatively rotatable film storage panel of floating hub type movie film bobbins.

BRIEF DESCRIPTION OF THE INVENTION

In accordance with this invention a movie film bobbin is provided with a floating hub preferably of plastic such as "Nylon" rotatable concentrically within two spaced circular film storage panels of similar plastic with the hub structure providing a bearing cavity for relatively rotatably receiving and retaining the spaced storage panels to thereby constitute a movie film spool, and a metallic bearing formed for example of bronze spring stock is retained between the panel to hub contact surfaces at least for the radial contact surfaces therebetween to produce a long wearing spool.

THE DRAWING

Figure 2:
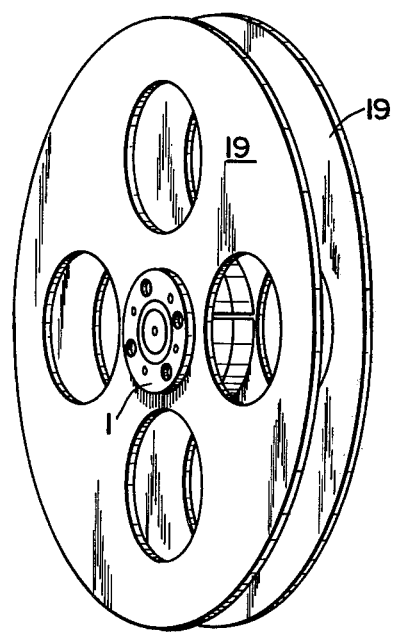
Figure 3:
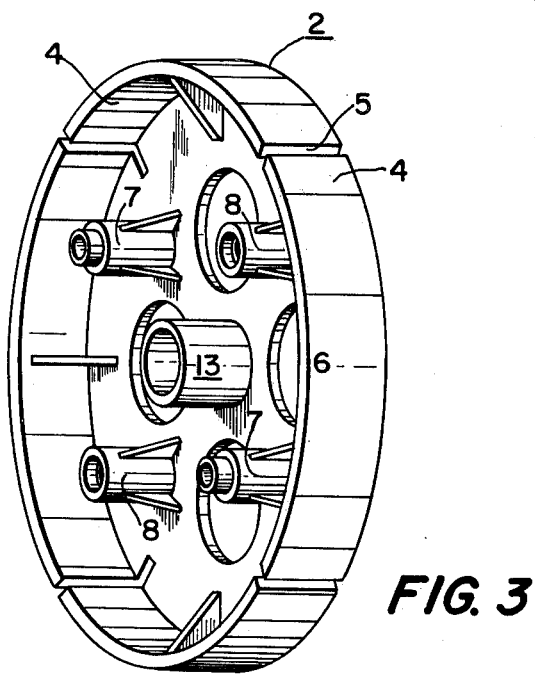
Figure 4:
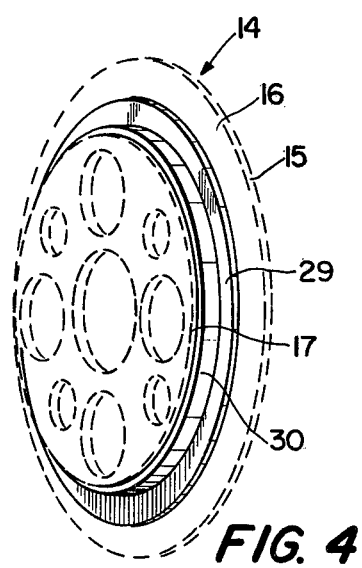
Figure 5:
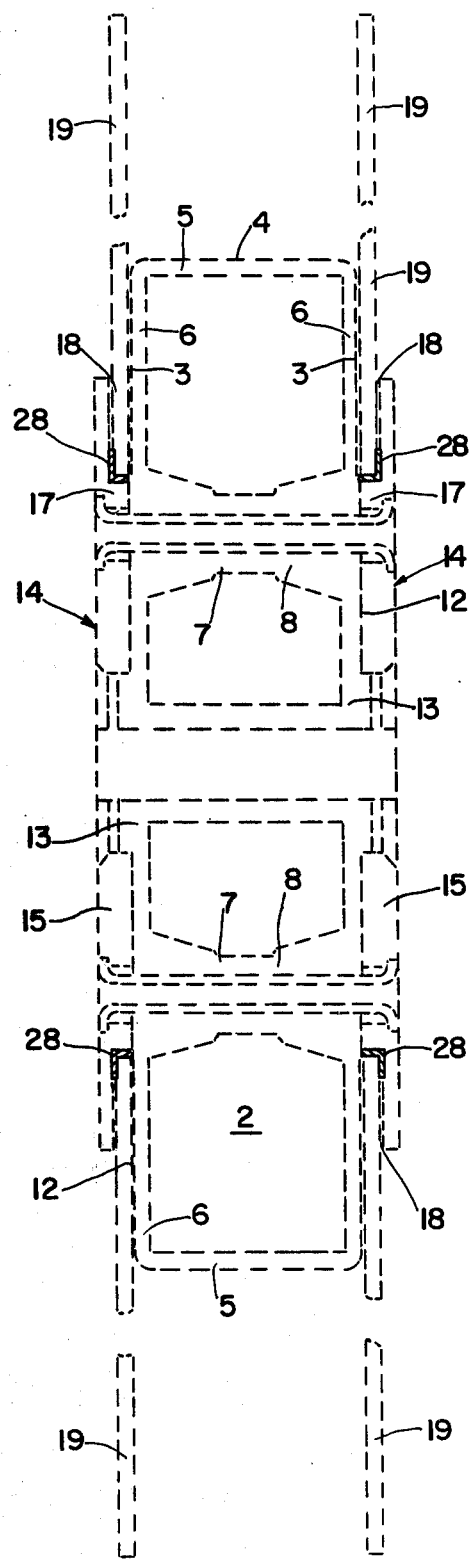

Other features, advantages and objectives of the invention will be found throughout the following detailed specification with reference to the accompanying drawing, wherein:

FIG. 1 is a perspective view of a bearing member positioned between the floating hub and storage panels of a movie film bobbin constructed in accordance with the teachings of this invention;

FIG. 2 is a perspective view of a movie film bobbin assembly with a floating hub with relatively rotatable storage panels retained therein, FIG. 3 is a perspective view of a half-section of the floating hub, FIG. 4 is a perspective view of a floating hub retainer panel which mates with the section of FIG. 3 to provide therebetween the bearing retainer surfaces for holding the rotatable storage panels, and FIG. 5 is an elevation section view of an assembled movie film bobbin constructed in accordance with this invention.

THE DETAILED DESCRIPTION

As may be seen by reference to FIGS. 1 and 2 the film bobbin of this invention has a floating hub 1 concentrically mounted within two spaced film storage panels 19 for relative rotation therewith. Both structures 1 and 19 are preferably of a material such as "Nylon" brand plastic which gives a low coefficient of friction for the relative movement therebetween. The bearing ring 28 is of a good bearing metal and may for example be a phosphor bronze spring stock stamping with a cylindrical surface 30 projecting from a flat washer like rim 29. The bearing ring is mounted on either side of hub 1 so that the cylindrical surface 30 is imposed between the mating surfaces of the hub 1 and panels 19 which otherwise radially come together for relative rotation, as may be viewed for example in FIG. 5.

The hub is constructed as described in the aforesaid patent in two mating sections as shown in FIG. 3 with an outer panel 14 on the outside as shown in dotted lines in FIG. 4. Thus, it may be seen how the bearing ring 28 surfaces 29 and 30 are held in place in the hub assembly between the outer panels and the hub sections 2.

Each hub section 2 has a circumferential base for receiving and winding film as expedited by slots 5 between base portions 4. The walls 6 support two male 7 and two female 8 stud fasteners which mate together with an opposite similar section to form the inner portion of the hub assembly as retained between two outer panels 14. These each generally having an outer rim 15 extending from a cylindrical boss 17 projecting inwardly to abut the hub section 2 thereby providing a spacing between rim 15 and section 2 in which circular film retaining panels 19 are retained for rotation.

Hub section 2 also has an abutting center boss 13, which is bored along with studs 7, 8 to provide for rivets or bolts for holding together the assembly of two film retaining panels 19, two hub sections 2 and two outer panels 14. Bearing rings 28 are interspersed radially between the panels 19 and the boss 17 to thereby reduce wear at the most critical friction surface, and thereby significantly increase the life of the film bobbin, as shown in FIG. 5. It is clear that there are significant side surfaces in contact between the film retaining panel 19 and hub structure so that wear there is little problem. However, if bearing ring 28 were not used, with relative rotation of hub and panels 19 over the narrow surface of radial contact it would otherwise tend to cause panel 19 to wear into boss 17 and thus cause problems of binding of failure. Also it is to be noted that the rim 29 of bearing ring 28 is placed on the outside surface of panel 19 where the shorter overlap bearing surface with the hub exists and therefore any tendency for that surface to wear will be decreased.

The spacing 18 between the hub section 2 sidewall 3 and the cover 14 serves as retaining and bearing side surfaces for relative rotation of panels 19 with respect to the hub, and thus the spacing 18 is about one millimeter wider than the thickness of panels 19. Similar for free rotation of the panels 19 the inner diameter at the position meeting the bearing rings 28 is about one millimeter greater than the outer diameter of the bearing rings. Preferably the metallic bearing rings 28 are force fit upon the boss 17 to prevent rotation and for frictional integration with the outer panels 14. The "Nylon" to bronze or other metal bearing surface gives a low coefficient of friction and long wear to thereby eliminate the critical wear mode of operation, namely that caused by the radial forces inwardly from the circular film retaining panels 19 toward the metallic bearing ring 28, which will otherwise tend to wear into boss 17.

Having therefore described the invention in detail those novel features believed descriptive of the nature and spirit of the invention are defined with particularity in the appended claims.

What is claimed is:

1. In a movie film spool having a rotatable hub with thin flat film retaining panels on opposite ends of the spool radially contacting the hub at a thin panel inner edge and rotating relative to the hub, the improvement comprising, plastic film retaining panel and hub members giving a low co-efficient of friction for relative movement therebetween, and a metal bearing ring mating between the hub and each film retaining panel comprising a flat ring with a cylindrical projecting surface extending between the panel inner edges and the hub to thereby prevent wear on the hub caused by radial forces between the panels inner edges and the hub.

2. The improvement defined in claim 1 wherein the hub has an inner center boss member receiving the film retaining panels thereover and outer removable hub panels holding the film retaining panels on the hub, wherein the bearing rings are positioned on the outer hub panels.

* * * * *